United States Patent
Mauritz et al.

(10) Patent No.: US 12,552,446 B2
(45) Date of Patent: Feb. 17, 2026

(54) STEERING DRIVE FOR A STEERING AXLE OF A STEERABLE VEHICLE, STEERING AXLE, AND INDUSTRIAL TRUCK

(71) Applicant: ZF Friedrichshafen AG, Friedrichshafen (DE)

(72) Inventors: Wolfgang Mauritz, Fürstenzell (DE); Max Leitner, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 574 days.

(21) Appl. No.: 18/055,987

(22) Filed: Nov. 16, 2022

(65) Prior Publication Data
US 2023/0159087 A1    May 25, 2023

(30) Foreign Application Priority Data
Nov. 22, 2021    (DE) ..................... 10 2021 213 067.4

(51) Int. Cl.
*B62D 5/04*    (2006.01)
(52) U.S. Cl.
CPC ......... *B62D 5/0421* (2013.01); *B62D 5/0403* (2013.01)
(58) Field of Classification Search
CPC ... B62D 5/0421; B62D 5/0403; B60K 7/0007
See application file for complete search history.

(56) References Cited

U.S. PATENT DOCUMENTS

| | | |
|---|---|---|
| 2,913,063 A | 11/1959 | Brown |
| 4,461,367 A | 7/1984 | Eichinger et al. |
| 4,930,590 A | 6/1990 | Love et al. |
| 5,087,229 A | 2/1992 | Hewko et al. |
| 5,327,986 A | 7/1994 | Saita |
| 5,722,501 A | 3/1998 | Finch et al. |
| 5,779,588 A | 7/1998 | Mann et al. |

(Continued)

FOREIGN PATENT DOCUMENTS

| | | | |
|---|---|---|---|
| CN | 204236559 U | * | 4/2015 |
| DE | 1630616 A | | 7/1971 |

(Continued)

OTHER PUBLICATIONS

United States Patent Office, Non-Final Office Action issued in U.S. Appl. No. 18/055,995 (mailed Feb. 5, 2025).

(Continued)

*Primary Examiner* — Jacob D Knutson
(74) *Attorney, Agent, or Firm* — Finch & Maloney PLLC

(57) ABSTRACT

A steering drive for a steering axle of a steerable vehicle includes an electric motor with a motor shaft. A steering lever is rotatable about a pivot axis that is parallel to the electric motor. First and second planetary stages each have a sun gear, planet gears, and a planet carrier. The steering drive is configured such that a force flow runs from the first sun gear via the first planet gears to the first planet carrier. The force flow furthermore runs via the second sun gear and via the second planet gears to the second planet carrier, and furthermore runs to the steering lever. The steering drive has a spur gear stage and is configured such that a force flow from the motor shaft to the first sun gear runs via the spur gear stage. Also disclosed is a steering axle and an industrial truck.

14 Claims, 1 Drawing Sheet

(56) References Cited

U.S. PATENT DOCUMENTS

| | | | |
|---|---|---|---|
| 5,828,972 A | 10/1998 | Asanuma et al. | |
| 6,026,925 A | 2/2000 | Nagao et al. | |
| 6,039,143 A | 3/2000 | Kielar et al. | |
| 6,125,963 A | 10/2000 | Staiger | |
| 6,279,676 B1 | 8/2001 | Peppler | |
| 6,349,781 B1 | 2/2002 | Kruse | |
| 6,367,571 B1 | 4/2002 | Schwarz | |
| 6,505,700 B2 | 1/2003 | Furumi et al. | |
| 6,523,632 B1 | 2/2003 | Hanaoka et al. | |
| 6,572,502 B1 | 6/2003 | Young et al. | |
| 6,691,819 B2 | 2/2004 | Menjak et al. | |
| 6,854,555 B2 | 2/2005 | Raue | |
| 7,497,286 B2 | 3/2009 | Keller et al. | |
| 7,549,502 B2 | 6/2009 | Gaetani | |
| 7,588,113 B2 | 9/2009 | Scharfenberg | |
| 7,591,340 B2 | 9/2009 | Scharfenberg et al. | |
| 7,617,890 B2 | 11/2009 | Romig | |
| 7,621,360 B2 | 11/2009 | Frank et al. | |
| 7,669,684 B2 | 3/2010 | Rogg | |
| 7,686,125 B2 | 3/2010 | Andersson | |
| 7,789,784 B2 | 9/2010 | Hayashi et al. | |
| 7,803,085 B2 | 9/2010 | Himmelmann | |
| 7,861,820 B1 | 1/2011 | Goodwin et al. | |
| 8,025,116 B2 | 9/2011 | Rogg | |
| 8,312,959 B1 | 11/2012 | Schneider et al. | |
| 8,439,152 B2 | 5/2013 | Visscher | |
| 8,449,424 B2 | 5/2013 | Schoon | |
| 8,950,520 B2 | 2/2015 | Hauser et al. | |
| 9,533,707 B1 | 1/2017 | Longtin | |
| 9,669,865 B2 | 6/2017 | Schröder et al. | |
| 10,293,847 B2 | 5/2019 | Calmettes et al. | |
| 10,479,399 B2 | 11/2019 | Beyerlein et al. | |
| 10,526,004 B2 | 1/2020 | Witte | |
| 10,556,617 B2 | 2/2020 | Wang et al. | |
| 10,647,346 B2 | 5/2020 | Cai et al. | |
| 10,730,546 B2 | 8/2020 | Ognibene | |
| 11,312,412 B2 | 4/2022 | Kim | |
| 11,325,638 B2 | 5/2022 | Wang et al. | |
| 11,358,636 B2 | 6/2022 | Visscher et al. | |
| 11,427,272 B2 | 8/2022 | Li et al. | |
| 11,511,793 B2 | 11/2022 | Anetzberger | |
| 11,554,807 B2 | 1/2023 | Kondo et al. | |
| 11,608,106 B2 | 3/2023 | Nakamura et al. | |
| 11,679,801 B2 | 6/2023 | Kondo et al. | |
| 11,685,427 B2 | 6/2023 | Major et al. | |
| 11,712,964 B1 | 8/2023 | Drach et al. | |
| 11,939,008 B2 | 3/2024 | Ko et al. | |
| 12,097,911 B2 | 9/2024 | Ooba et al. | |
| 12,122,463 B2 | 10/2024 | Ishihara et al. | |
| 12,291,094 B2 | 5/2025 | Labelle | |
| 2006/0055139 A1 | 3/2006 | Furumi et al. | |
| 2006/0278466 A1 | 12/2006 | Cheng | |
| 2009/0272594 A1* | 11/2009 | Bussinger | B60K 17/30 180/264 |
| 2022/0212714 A1 | 7/2022 | Span et al. | |
| 2023/0052313 A1 | 2/2023 | Cai et al. | |
| 2023/0159083 A1 | 5/2023 | Mauritz | |
| 2023/0159085 A1 | 5/2023 | Stammberger et al. | |
| 2023/0159087 A1 | 5/2023 | Wolfgang et al. | |
| 2023/0159088 A1 | 5/2023 | Mauritz | |
| 2023/0159097 A1 | 5/2023 | Wolfgang et al. | |
| 2023/0174141 A1 | 6/2023 | Mauritz | |
| 2023/0373245 A1 | 11/2023 | Pfeffer et al. | |
| 2024/0132145 A1 | 4/2024 | Jeon | |
| 2024/0270063 A1 | 8/2024 | Yoon et al. | |

FOREIGN PATENT DOCUMENTS

| | | | |
|---|---|---|---|
| DE | 19911458 A1 | 10/1999 | |
| DE | 10130100 A1 | 1/2003 | |
| DE | 103 16 599 A1 | 11/2004 | |
| DE | 10328651 A1 | 1/2005 | |
| DE | 10 2004 038 411 A1 | 8/2005 | |
| DE | 10 2004 006 722 A1 | 9/2005 | |
| DE | 102006002485 A1 * | 9/2007 | ........... B60K 17/303 |
| DE | 10 2009 002 934 A1 | 11/2010 | |
| DE | 10 2009 002 935 A1 | 11/2010 | |
| DE | 10 2014 100 865 A1 | 7/2015 | |
| DE | 10 2016 201 227 A1 | 8/2017 | |
| DE | 10 2017 222 334 A1 | 6/2019 | |
| DE | 10 2017 222 887 A1 | 6/2019 | |
| DE | 10 2019 116 644 A1 | 12/2019 | |
| DE | 10 2018 222 232 A1 | 6/2020 | |
| DE | 102019001515 A1 * | 9/2020 | |
| DE | 10 2022 205 373 A1 | 12/2023 | |
| EP | 0507137 A1 | 10/1992 | |
| EP | 1747930 A1 | 1/2007 | |
| EP | 2 569 205 B1 | 4/2014 | |
| EP | 3 250 441 B1 | 1/2019 | |
| GB | 2165505 A1 | 4/1986 | |
| JP | H08258728 | 10/1996 | |
| JP | 1999-011330 A2 | 1/1999 | |
| KR | 10-2024-0126598 A | 8/2024 | |
| WO | WO-2005077695 A1 * | 8/2005 | ............... B60K 7/00 |
| WO | WO2018152940 A1 | 8/2018 | |

OTHER PUBLICATIONS

United States Patent Office, Non-Final Office Action issued in U.S. Appl. No. 18/056,000 (mailed Feb. 14, 2025).

German Patent Office, Office Action issued in German patent application No. 10 2021 213 068.2 (Sep. 26, 2022).

German Patent Office, Office Action issued in German patent application No. 10 2021 213 063.1 (Oct. 5, 2022).

German Patent Office, Office Action issued in German patent application No. 10 2021 213 862.4 (Jul. 8, 2022).

United States Patent Office, Final Office Action issued in U.S. Appl. No. 18/055,995 (mailed Jul. 3, 2025).

United States Patent Office, Non-Final Office Action issued in U.S. Appl. No. 18/061,679 mailed May 30, 2025).

United States Patent Office, Notice of Allowance issued in U.S. Appl. No. 18/065,010 mailed Jul. 9, 2025).

* cited by examiner

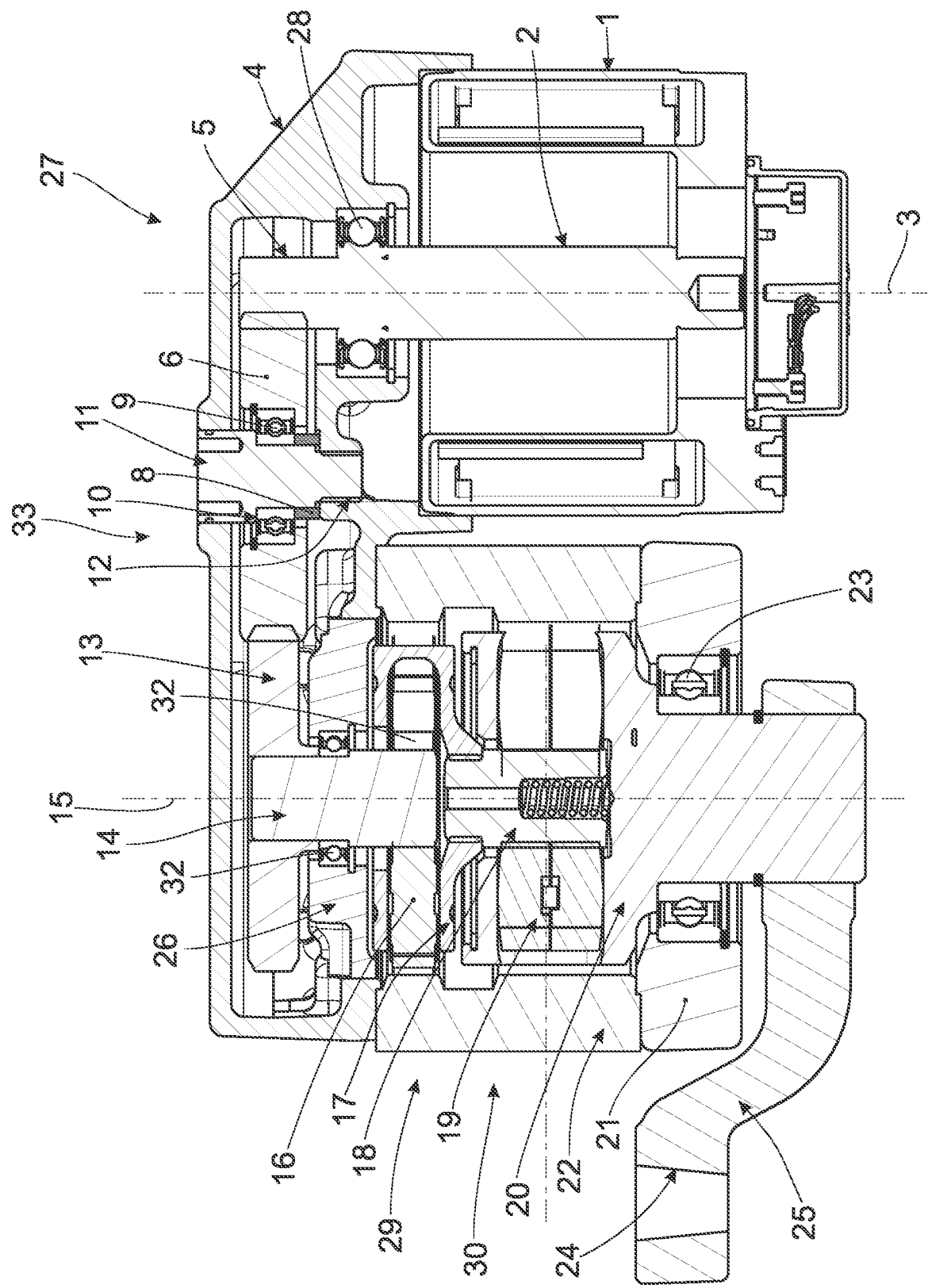

STEERING DRIVE FOR A STEERING AXLE OF A STEERABLE VEHICLE, STEERING AXLE, AND INDUSTRIAL TRUCK

RELATED APPLICATIONS

This application claims the benefit of and right of priority under 35 U.S.C. § 119 to German Patent Application no. 10 2021 213 067.4, filed on 22 Nov. 2021, the contents of which are incorporated herein by reference in its entirety.

FIELD OF THE DISCLOSURE

The invention relates to a steering drive for a steering axle of a steerable vehicle, to a corresponding steering axle, and to a corresponding industrial truck.

BACKGROUND

The prior art has disclosed various embodiments of servo steering units which either assist a manual steering input by a driver or automatically set a desired steering angle in response to an electrical signal. Here, a hydraulic cylinder or an electric motor is commonly used as an actuator. In addition to the actuator, these steering units generally comprise a steering gear of concentric construction and have a shaft as an output. The steering units are of column-like construction with a pedestal in the lower region, which pedestal serves for fastening to a chassis of the vehicle. The upper region of the steering unit is rotatable relative to the lower region in order to set a steering angle at the steerable wheels.

In this context, DE 10 2019 116 644 A1 has disclosed a servo steering unit for vehicles, which servo steering unit comprises a steering column with a pedestal and comprises an electrically assisted steering apparatus with a housing and electric motor, the housing being movable relative to the pedestal with one degree of freedom. The steering column itself furthermore comprises a lower spindle which is rotatably connected to, and partially contained within, the pedestal. The electric motor is configured such that it can set the lower spindle in rotation via an output shaft.

SUMMARY

Known servo steering units however have the disadvantage that, owing to their column-like structural form, they have a large space requirement and are subject to unfavourable mechanical loads, which can in turn lead to increased wear and failure of the servo steering units.

It is an object of the present invention to propose an improved steering drive for a steering axle of a steerable vehicle.

Said object is achieved according to the invention by means of the steering drive for a steering axle of a steerable vehicle according to the present disclosure. Advantageous embodiments and refinements of the invention will emerge from the present disclosure.

The invention relates to a steering drive for a steering axle of a steerable vehicle, comprising an electric motor with a motor shaft, comprising a first planetary stage with a first sun gear, first planet gears and a first planet carrier, comprising a second planetary stage with a second sun gear, second planet gears and a second planet carrier, and comprising a steering lever, the steering drive being configured such that a force flow runs from the first sun gear via the first planet gears to the first planet carrier, such that the force flow furthermore runs via the second sun gear and via the second planet gears to the second planet carrier, and such that the force flow furthermore runs to the steering lever, and the steering lever being supported so as to be rotatable about a pivot axis. The steering drive according to the invention is distinguished by the fact that the steering drive furthermore comprises a spur gear stage, wherein the electric motor is arranged parallel to the pivot axis, and wherein the steering drive is configured such that a force flow from the motor shaft to the first sun gear runs via the spur gear stage.

Thus, an electric steering drive is provided, which is intended for actuating the steerable wheels of a steering axle of a steerable vehicle. The vehicle is preferably a utility vehicle, such as an agricultural machine, a work machine or an industrial truck.

The steering drive comprises an electric motor with a motor shaft. The electric motor is preferably a three-phase brushless electric motor. Here, in accordance with an actuation, the electric motor respectively provides the required torque and the required rotational speed. The steering drive furthermore comprises a first and a second planetary stage, having a first and a second sun gear respectively, first and second planet gears respectively and a first and a second planet carrier respectively, and comprises a steering lever.

The first and the second planetary stage are arranged such that the force flow runs from the first sun gear via the first planet gears to the first planet carrier, at least two first planet gears being provided, and the first planet gears meshing with the first sun gear and being held by the first planet carrier. Torques and rotational speeds can thus be transmitted from the first sun gear to the first planet carrier.

From the first planet carrier, the force flow furthermore runs to the second sun gear, the first planet carrier and the second sun gear being connected rotationally conjointly to one another, for example by means of a spline toothing or via a welded connection, and in particular being formed as a single piece. The second sun gear meshes with the second planet gears, such that the force flow runs from the second sun gear to the second planet gears. It is advantageous for at least two planet gears to be provided. From the second planet gears, the force flow runs to the second planet carrier, which holds the second planet gears. Torques and rotational speeds can correspondingly also be transmitted from the second sun gear to the second planet carrier.

The force flow finally runs onward from the second planet carrier to the steering lever, the steering lever being supported so as to be rotatable about a pivot axis. The second planet carrier and the steering lever are advantageously connected rotationally conjointly to one another, for example by means of a spline toothing. A rotational movement of the second planet carrier can thus be easily converted into a steering movement of the steerable wheels of the steering axle. For example, the steering lever may actuate a steering linkage of the steering axle. Here, the pivot axis is preferably the axis of rotation of the second planet carrier.

A rotation of the first sun gear thus results in a pivoting movement of the steering lever. A rotational movement of the motor shaft is thus ultimately converted into a rotational movement of the steering lever.

In other words, a rotation of the motor shaft thus results in a rotational movement of the final planet carrier, whereas the ring gear is held fixed.

The first and the second planet stage are advantageously arranged coaxially, such that the pivot axis is simultaneously the axis of rotation of the first and of the second planetary stage.

According to the invention, provision is now made whereby the steering drive furthermore comprises a spur gear stage, wherein the electric motor is arranged parallel to the pivot axis, and wherein the steering drive is configured such that a force flow from the motor shaft to the first sun gear runs via the spur gear stage.

By virtue of the electric motor being arranged parallel to the pivot axis—and not coaxially as is conventional in the prior art—an advantageously short structural height of the steering drive according to the invention is advantageously realized, such that the steering drive according to the invention can also be used for steering axles or vehicles which are relatively compact and which can thus provide only little structural space. An advantage is achieved here in particular in the case of relatively compact vehicles such as industrial trucks.

The use of the spur gear stage for guiding the force flow from the motor shaft of the electric motor to the first sun gear furthermore offers the advantage here that a speed reduction of the rotational speed of the motor shaft can advantageously be achieved already by means of the spur gear mechanism. The spur gear stage is accordingly preferably configured as a speed reduction stage. It is thus advantageously possible to omit a third planetary stage, because the required overall speed reduction can also be achieved by means of the first planetary stage, the second planetary stage and the spur gear stage. It is however at least possible for the first and the second spur gear stage to be made more compact, because they each need to provide only a relatively small speed reduction.

The invention accordingly leads to a synergistic effect owing to the spur gear stage that is preferably configured as a speed reduction stage, because, by means of the spur gear stage, not only can the electric motor be offset in parallel with respect to the pivot axis, whereby the structural height of the steering drive is significantly reduced, but it is also possible for the first planetary stage and the second planetary stage to be of compact and structural-space-saving form, and in particular, no third planetary stage is required.

The spur gear stage advantageously comprises at least two spur gears.

This yields the advantage that the steering drive has a very short structural form in relation to the prior art, and the steering axle is accordingly of relatively space-saving form.

In one preferred embodiment of the invention, provision is made whereby the steering drive comprises a housing, a partial region of the housing constituting a front end shield of the electric motor. Here, the housing of the steering drive makes it possible for all components of the steering drive to be arranged in their respectively required position in or on the housing, and thus for the steering drive to be functional. The housing preferably furthermore has a protective action for the steering drive, in that it keeps in particular contaminants, moisture and other corrosive substances away from those components of the steering drive which are arranged in the housing. By virtue of the fact that the partial region of the housing constitutes the front end shield of the electric motor, a separate end shield that would otherwise be required can advantageously be omitted. The steering drive is thus relatively lightweight, compact and inexpensive.

In a further preferred embodiment of the invention, provision is made whereby the motor shaft has a toothing that meshes with an intermediate gear of the spur gear stage. The motor shaft, by means of its toothing, thus already has a first gear of the spur gear stage. The toothing may be formed on the motor shaft by milling, for example. Since the motor shaft commonly has a relatively small diameter, a relatively large speed reduction can thus be easily achieved already in the force flow from the motor shaft to the intermediate gear.

In one particularly preferred embodiment of the invention, provision is made whereby the intermediate gear is supported by means of a bolt that can be screwed into the housing. Here, the bolt also constitutes the axis about which the intermediate gear is rotatable. In order that it can be screwed into the housing, the bolt advantageously has an external thread, and the housing has a corresponding internal thread for receiving the bolt. The intermediate gear can thus be easily and inexpensively arranged at the required position in the housing.

In a further particularly preferred embodiment of the invention, provision is made whereby the intermediate gear meshes with a further spur gear that is connected rotationally conjointly to the first sun gear. The further spur gear constitutes the output of the spur gear stage and guides the force flow from the electric motor to the first spur gear stage, specifically to the first sun gear.

The further spur gear and the first sun gear are preferably both arranged on a common shaft, to which they are each connected rotationally conjointly, for example by means of a spline toothing.

The first sun gear and the shaft may preferably also be formed as a single piece, or else the further spur gear and the shaft are formed as a single piece.

In a further preferred embodiment of the invention, provision is made whereby the further spur gear is supported on a first cover that closes the first spur gear stage and the second spur gear stage in a partial region of the housing. The first cover thus performs two mutually independent functions in that it firstly closes that partial region of the housing in which the spur gear stages are arranged, and thus holds the spur gear stages in place, and secondly supports the further spur gear. The first cover advantageously supports the further spur gear via the shaft that rotationally conjointly connects the further spur gear to the first sun gear.

In a further preferred embodiment of the invention, provision is made whereby the steering lever has a conical receptacle for the arrangement of a bearing assembly. Via the conical region, force can be introduced for example into a linkage, for example coupling or tie rods, for the actuation of the steerable wheels. Here, the conical region of the steering lever is advantageously arranged at the same level as a bearing assembly of the steering lever, such that forces can be transmitted into the steering lever, and forces can be transmitted out of the steering lever, without tilting.

In a further preferred embodiment of the invention, provision is made whereby the steering lever and the second planet carrier are supported on a second cover by a common bearing assembly. Since the second planet carrier and the steering lever are connected rotationally conjointly to one another, they can advantageously also be jointly supported. Here, in particular from an opposite direction in relation to the first cover, the second cover likewise closes that partial region of the housing in which the first spur gear stage and the second spur gear stage are arranged.

In a further preferred embodiment of the invention, provision is made whereby the steering drive comprises a ring gear, the ring gear meshing with the first planet gears and the second planet gears and being arranged rotationally fixedly with respect to the housing. The ring gear thus radially encloses the first planetary stage and the second planetary stage and supports the first and the second planet gears on the housing. By virtue of the ring gear being rotationally fixed with respect to the housing, it is furthermore possible for the force flow to be guided entirely into the second planet carrier and led onward from there to the steering lever.

Provision may preferably be made whereby the ring gear is composed of a multiplicity of individual ring gears that are arranged concentrically with respect to one another.

In one particularly preferred embodiment of the invention, provision is made whereby the ring gear is held between the first and the second cover. This has the result that the first and the second planetary stage can be installed particularly easily, because both the first cover and the second cover can be removed, such that the further elements of the first and of the second planetary stage can be arranged within the ring gear.

The invention also relates to a steering axle comprising a steering drive according to the invention. The advantages already described in conjunction with the steering drive according to the invention are thus also realized for the steering axle according to the invention.

The steering axle furthermore preferably comprises an axle body and two steerable wheels.

The invention furthermore relates to an industrial truck comprising a steering axle according to the invention. The advantages already described in conjunction with the steering axle according to the invention are thus also realized for the industrial truck according to the invention.

The invention will be discussed by way of example below on the basis of embodiments illustrated in the FIGURES.

BRIEF DESCRIPTION OF THE DRAWING

In the drawings:

FIG. 1 shows, by way of example and schematically, a possible embodiment of a steering drive according to the invention for a steering axle of a steerable vehicle.

Identical objects, functional units and similar components are denoted by the same reference designations throughout the figures. These objects, functional units and similar components are of identical design in terms of their technical features unless explicitly or implicitly stated otherwise in the description.

DETAILED DESCRIPTION

FIG. 1 shows, by way of example and schematically, a possible embodiment of a steering drive 27 according to the invention for a steering axle (not illustrated) of a steerable vehicle.

The steering drive 27 comprises an electric motor 1 with a motor shaft 2. The electric motor 1 and the motor shaft 2 are in this case concentric with respect to an axis 3, which also constitutes the axis of rotation of the motor shaft 2. As can be seen, the motor shaft 2 is supported in a housing 4 of the steering drive by means of a bearing assembly 28. The housing 4 thus, in the region of the bearing assembly 28, constitutes a front end shield of the electric motor 1.

The steering drive 27 furthermore comprises a first planetary stage 29 with a first sun gear 31, first planet gears 16 and a first planet carrier 17 and comprises a second planetary stage 30 with a second sun gear 18, second planet gears 19 and a second planet carrier 20. The first sun gear 31 meshes with the first planet gears 19, which are held by the first planet carrier 17. The first planet carrier 17 is connected rotationally conjointly to the second sun gear 18, which in turn meshes with the second planet gears 19. The second planet gears 19 are held by the second planet carrier 20.

The first planetary stage 29 and the second planetary stage 30 are furthermore enclosed radially by a ring gear 22. Both the first planet gears 16 and the second planet gears 19 mesh with the ring gear 22. Here, the ring gear 22 is held rotationally fixedly between a first cover 26 and a second cover 21. The first cover 26 and the second cover 21 axially enclose the first planetary stage 29 and the second planetary stage 30 and thus enclose a partial region of the housing 4 which houses the first planetary stage 29 and the second planetary stage 30.

Furthermore, the steering drive 27 also comprises a steering lever 25, which is connected rotationally conjointly to the second planet carrier 20. The steering lever 25 itself has a conical receptacle 24 for the arrangement of the bearing assembly (not illustrated). As can be seen, the receptacle 24 is situated at the same level as the bearing assembly 23 which supports the second planet carrier 20 and the steering lever 25. The bearing assembly 32 can thus be kept free of tilting forces.

The steering drive 27 finally also comprises a spur gear stage 33 which, in the example, comprises a toothing 5 of the motor shaft 2, an intermediate gear 6, and a further spur gear 13. The intermediate gear 6 is supported on a bolt 11 via a bearing assembly 9. The bolt 11 has, at its lower end, a threaded region 7 by means of which it is screwed into a corresponding mating thread 12 of the housing 4. An inner ring of the bearing assembly 9 is clamped axially by means of a planar contact surface 10 and a ring 8, which is planar on both sides. The further spur gear 13 is supported, via a bearing assembly 32, on a shaft 14 on which the first sun gear 31 is also supported. The shaft 14, the first sun gear 31 and the further spur gear are rotatable about the pivot axis 15, in the same way as the steering lever 25 is pivotable about the pivot axis 15. The toothing 5 of the motor shaft 2 meshes with the intermediate gear 6, and the intermediate gear 6 meshes with the further spur gear 13.

In FIG. 1, a force flow in the steering drive runs from the electric motor 1 via the motor shaft 2, and the toothing 5 of the motor shaft 2, to the intermediate gear 6. A first speed reduction of the rotational speed occurs here. The force flow runs onward to the further spur gear 13 and via the shaft 14 to the first sun gear 31. From there, the force flow runs via the first planet gears 16 to the first planet carrier 17, and onward via the second sun gear 18 and via the second planet gears 19 to the second planet carrier 20. Since the ring gear 22 is held rotationally fixed with respect to the housing 4, the force flow runs onward from the second planet carrier 20 to the steering lever 25, such that the steering lever 25 can actuate a steering system of the steering axle.

REFERENCE SIGNS

1 Electric motor
2 Motor shaft
3 Axis
4 Housing
5 Toothing of the motor shaft
6 Intermediate gear
7 Thread region
8 Ring
9 Bearing assembly
10 Contact surface
11 Bolt
12 Mating thread
13 Further spur gear
14 Shaft
15 Axis
16 First planet gear
17 First planet carrier 18 Second sun gear
19 Second planet gear
20 Second planet carrier
21 Second cover
22 Ring gear
23 Bearing assembly
24 Receptacle
25 Steering lever
26 First cover
27 Steering drive
28 Bearing assembly
29 First planetary stage
30 Second planetary stage
31 First sun gear
32 Bearing assembly
33 Spur gear stage

The invention claimed is:

1. A steering drive for a steering axle of a steerable vehicle, comprising:
   an electric motor with a motor shaft;
   a first planetary stage with a first sun gear, first planet gears, and a first planet carrier;
   a second planetary stage with a second sun gear, second planet gears, and a second planet carrier; and
   a steering lever with a spur gear stage, the steering lever rotatable about a pivot axis that is parallel to the electric motor;
   wherein the steering drive is configured such that a force flow runs from the first sun gear via the first planet gears to the first planet carrier, such that the force flow furthermore runs via the second sun gear and via the second planet gears to the second planet carrier, and such that the force flow furthermore runs to the steering lever, and the steering lever being supported so as to be rotatable about the pivot axis; and
   wherein the steering drive is configured such that a force flow from the motor shaft to the first sun gear runs via the spur gear stage.

2. The steering drive as claimed in claim 1, wherein the steering drive comprises a housing, a partial region of the housing constituting a front end shield of the electric motor.

3. The steering drive as claimed in claim 2, wherein the motor shaft has a toothing that meshes with an intermediate gear of the spur gear stage.

4. The steering drive as claimed in claim 3, wherein the intermediate gear is supported by means of a bolt that can be screwed into the housing.

5. The steering drive as claimed in claim 3, wherein the intermediate gear meshes with a further spur gear that is connected rotationally conjointly to the first sun gear.

6. The steering drive as claimed in claim 5, wherein the further spur gear is supported on a first cover that closes the first planetary stage and the second planetary stage in a partial region of the housing.

7. The steering drive as claimed in claim 6, wherein the steering lever has a conical receptacle for the arrangement of a bearing assembly.

8. The steering drive as claimed in claim 6, wherein the steering lever and the second planet carrier are supported on a second cover by a common bearing assembly.

9. The steering drive as claimed in claim 8, wherein the steering drive comprises a ring gear, the ring gear meshing with the first planet gears and the second planet gears and being arranged rotationally fixed with respect to the housing.

10. The steering drive as claimed in claim 9, wherein the ring gear is held between the first cover and the second cover.

11. A steering axle comprising a steering drive as claimed in claim 1.

12. An industrial truck comprising the steering axle as claimed in claim 11.

13. A steering drive for a steering axle of a steerable vehicle, comprising:
    an electric motor with a motor shaft;
    a first planetary stage with a first sun gear, first planet gears, and a first planet carrier;
    a second planetary stage with a second sun gear, second planet gears, and a second planet carrier; and
    a steering lever having a spur gear stage with an intermediate gear, the steering lever rotatable about a pivot axis that is parallel to the electric motor; and
    a housing, wherein part of the housing constitutes a front-end shield of the electric motor;
    wherein the intermediate gear is supported by means of a bolt that can be screwed into the housing;
    wherein the motor shaft has a toothing that meshes with the intermediate gear of the spur gear stage;
    wherein the steering drive is configured such that a force flow runs from the first sun gear via the first planet gears to the first planet carrier, such that the force flow furthermore runs via the second sun gear and via the second planet gears to the second planet carrier, and such that the force flow furthermore runs to the steering lever, and the steering lever being supported so as to be rotatable about the pivot axis; and
    wherein the steering drive is configured such that a force flow from the motor shaft to the first sun gear runs via the spur gear stage.

14. A steering drive for a steering axle of a steerable vehicle, comprising:
    an electric motor with a motor shaft;
    a first planetary stage with a first sun gear, first planet gears, and a first planet carrier;
    a second planetary stage with a second sun gear, second planet gears, and a second planet carrier;
    a housing, wherein part of the housing constitutes a front end shield of the electric motor; and
    a steering lever with a spur gear stage, the steering lever rotatable about a pivot axis that is parallel to the electric motor, wherein the steering lever and the second planet carrier are supported on the housing by a common bearing assembly;
    wherein the steering drive is configured such that a force flow runs from the first sun gear via the first planet gears to the first planet carrier, such that the force flow furthermore runs via the second sun gear and via the second planet gears to the second planet carrier, and such that the force flow furthermore runs to the steering lever, and the steering lever being supported so as to be rotatable about the pivot axis; and
    wherein the steering drive is configured such that a force flow from the motor shaft to the first sun gear runs via the spur gear stage.

* * * * *